(No Model.) 5 Sheets—Sheet 1.
G. A. FARRAND.
POTATO SPRINKLER.
No. 390,657. Patented Oct. 9, 1888.
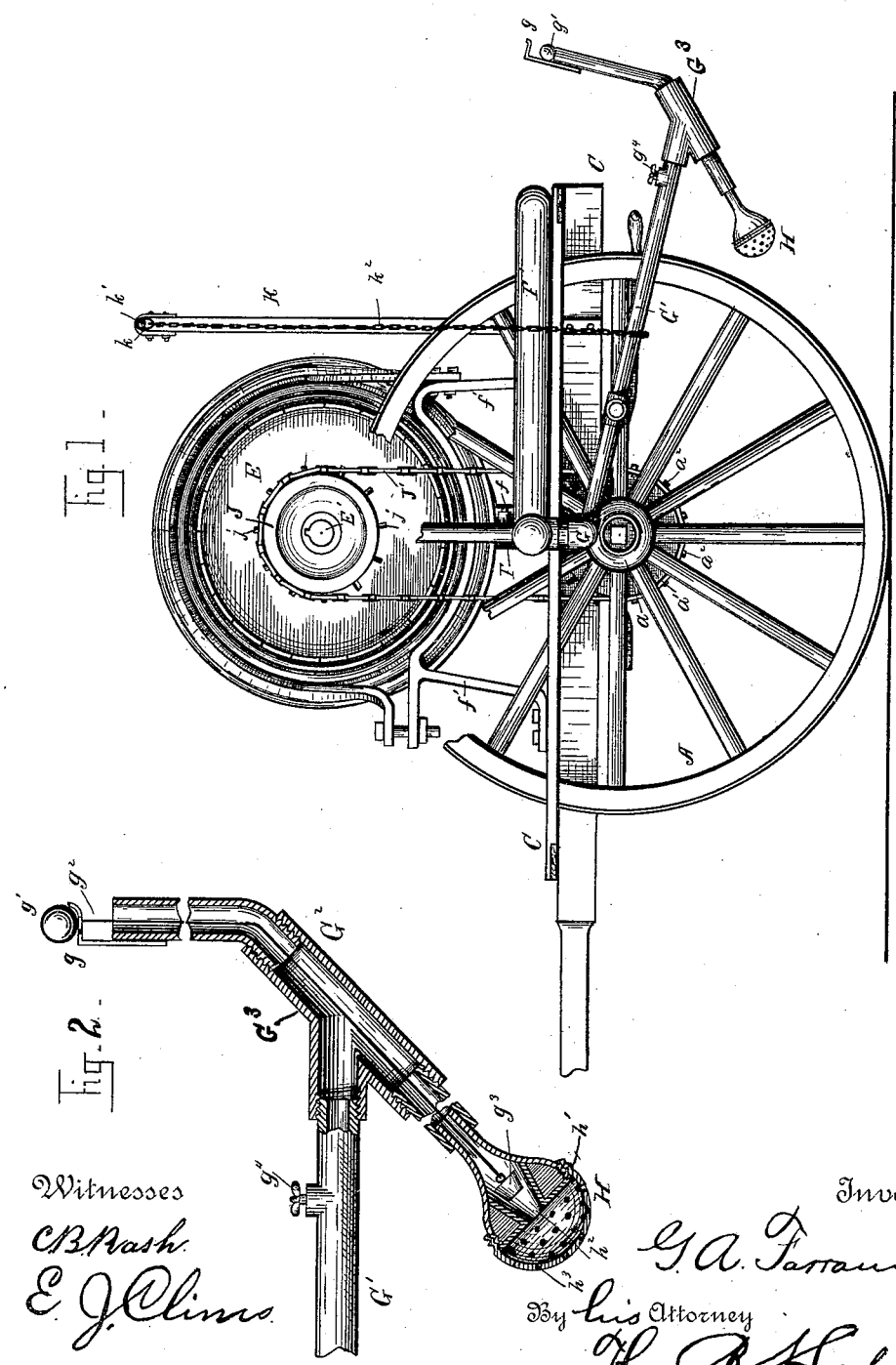
Witnesses
C. B. Nash
E. J. Clims
Inventor
G. A. Farrand
By his Attorney
Thos. B. Hall (No Model.)  5 Sheets—Sheet 2.
G. A. FARRAND.
POTATO SPRINKLER.
No. 390,657. Patented Oct. 9, 1888.
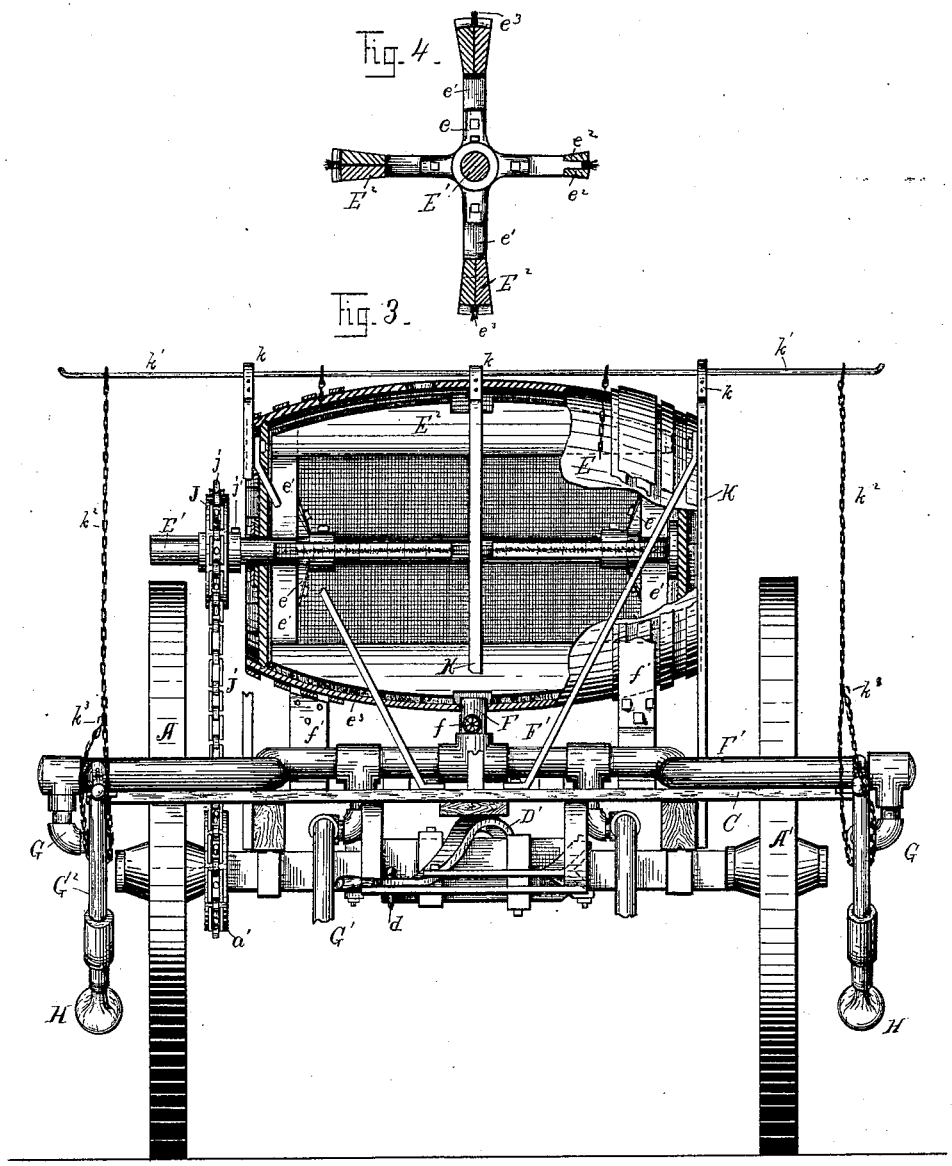

(No Model.) 5 Sheets—Sheet 3.
G. A. FARRAND.
POTATO SPRINKLER.
No. 390,657. Patented Oct. 9, 1888.
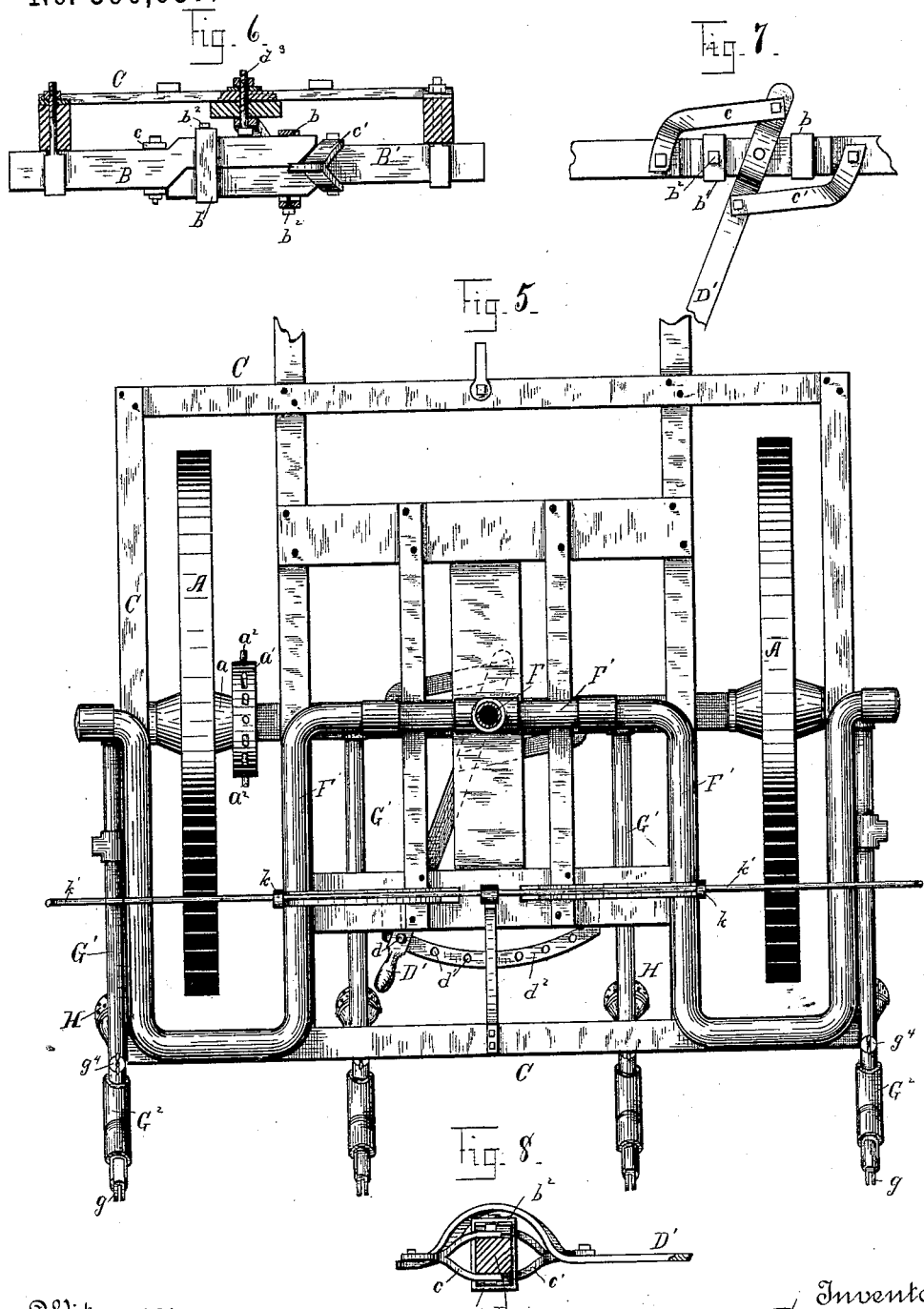
Witnesses
C. B. Nash
E. J. Olimo
Inventor
G. A. Farrand
By his Attorney
Thos. D. Hall (No Model.) 5 Sheets—Sheet 4.
G. A. FARRAND.
POTATO SPRINKLER.
No. 390,657. Patented Oct. 9, 1888.
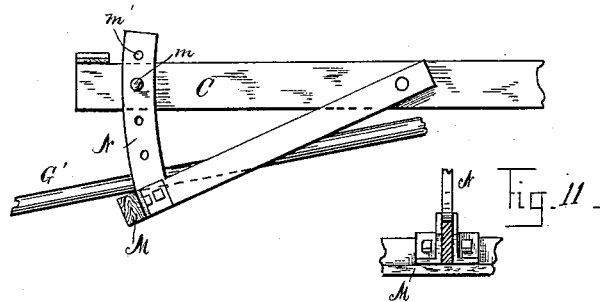
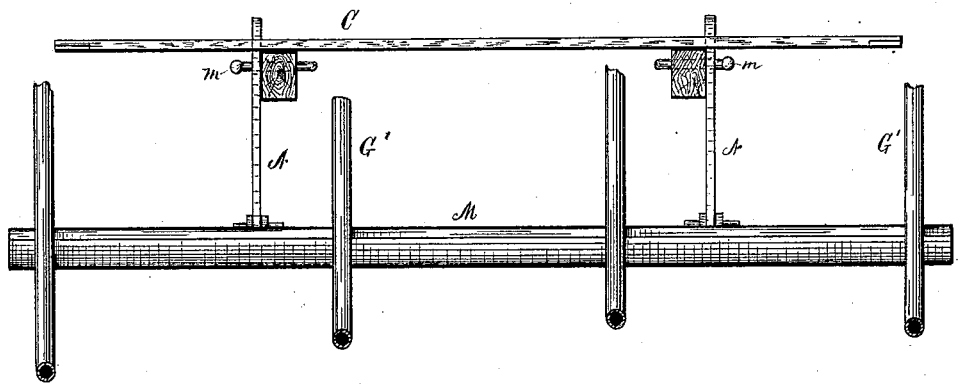
Witnesses
C. B. Nash.
E. J. Climo.
Inventor
G. A. Farrand
By his Attorney
Thos. D. Hall

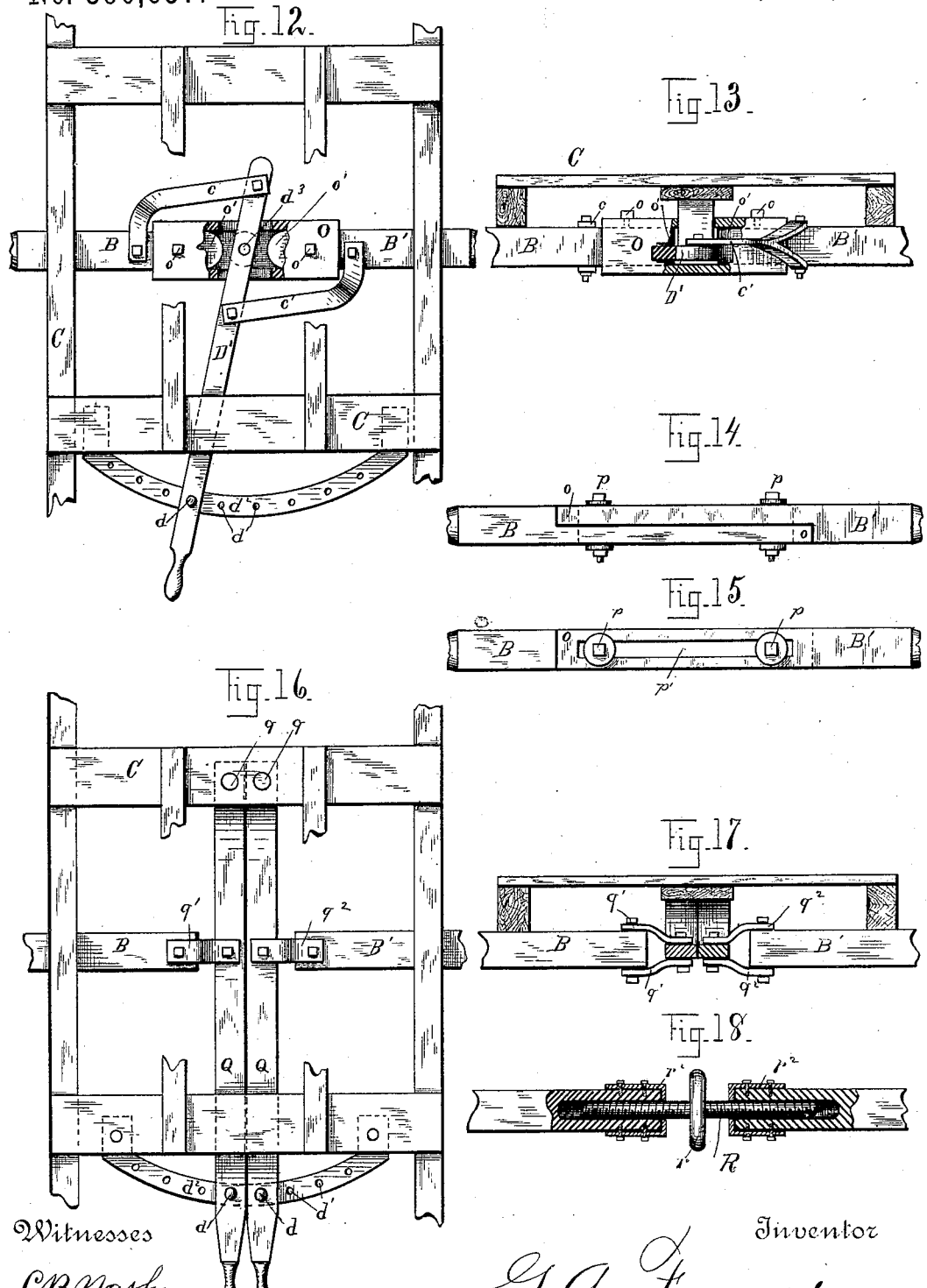

UNITED STATES PATENT OFFICE.

GEORGE A. FARRAND, OF ROCKPORT, ASSIGNOR OF ONE-HALF TO JOHN B. COFFINBERRY, OF CLEVELAND, OHIO.

POTATO-SPRINKLER.

SPECIFICATION forming part of Letters Patent No. 390,657, dated October 9, 1888.

Application filed September 10, 1887. Serial No. 249,302. (No model.)

*To all whom it may concern:*

Be it known that I, GEORGE A. FARRAND, a citizen of the United States, residing at Rockport, county of Cuyahoga, and State of Ohio, have invented certain new and useful Improvements in Potato-Sprinklers; and I do hereby declare the following to be a description of the same, and of the manner of constructing and using the invention, in such full, clear, concise, and exact terms as to enable any person skilled in the art to which it appertains to construct and use the same, reference being had to the accompanying drawings, forming a part of this specification, the principle of the invention being herein explained and the best mode in which I have contemplated applying that principle, so as to distinguish it from other inventions.

My invention relates to apparatus for distributing poisonous mixtures on potatoes and other agricultural and garden products that are infested with bugs and insects detrimental to their perfect development.

The particular points of improvement are, first, a potato-sprinkler having an adjustable axle-tree, whereby the tread can be adjusted to suit the varying distance between the rows of plants to be sprinkled; second, a reservoir for holding the liquid, provided with a series of agitators connected with the wheels of the carriage, whereby the agitators are rotated as the carriage is moved; third, an adjustable support for regulating the height of the distributing-pipes; fourth, providing the distributing-pipes with a universal joint, thereby permitting them to be turned in any direction, also providing each with an automatic valve which will shut by the pressure of the fluid, when desired; fifth, an improved form of rose for the pipes.

Referring to the drawings, Figure 1 is a side elevation view of the sprinkler. Fig. 2 is a detail central section of branch pipes $G^2$ and rose H, together with the plug-connecting apparatus. Fig. 3 is a rear elevation view of the sprinkler, the reservoir being shown in section. Fig. 4 is a detail transverse sectional view of the agitator-arms, one of them being sectioned on the dotted line of Fig. 3, the remaining ones being sectioned through the center of the reservoir. Fig. 5 is a plan view of the carriage with the reservoir removed. Fig. 6 is a detail elevation view of the central portion of the two-part axle-tree. Fig. 7 is a detail plan view of the lever mechanism for adjusting the axle-tree. Fig. 8 is a detail elevation of the same lever mechanism. Fig. 9 is a detail side elevation view of a modified form of support for the distributing-pipes. Fig. 10 is a front view of the same. Fig. 11 is a detail view of the mode of securing the hanger to the supporting-rod. Fig. 12 is a plan view of a modified form of securing the two-part axle together. Fig. 13 is a rear elevation view of this modified form of axle, certain parts being shown in section. Fig. 14 is an elevation view of another modified form for securing the axle together. Fig. 15 is a plan view of the same. Fig. 16 is a plan view of a fourth modified form of securing the two parts of the axle. Fig. 17 is a rear elevation view of the same. Fig. 18 is a plan view of a modified form of securing the two-part axle together by means of a right and left hand screw.

A A' are the wheels of the sprinkler. B B' are the two portions of the axle-tree; C, the supporting-frame provided with the shafts C'. Pivoted by king-bolt $d^3$ to supporting-bar D, which is secured to the axle-tree, is the lever D', provided at one end with pin $d$, adapted to fit in any one of the holes $d'$ of the lock-bar $d^2$. Welded to the half axle-tree B, and encircling, also, section B', is the clip $b$, and welded to B' and encircling B is the clip $b'$. These are respectively adjustably secured to sections B' B by the set screws $b^2$. Pivoted, respectively, at its opposite ends to section B and lever D' is the lever $c$. Lever $c'$ is similarly pivoted to section B' and to lever D'. Rigidly secured to the hub $a$ of the wheel A is an enlarged hub, $a'$, which is provided on its outer periphery with a series of lugs, $a^2$.

Leading from the reservoir E is the pipe F, connecting with the cross-pipe F', which extends transversely under the reservoir and parallel with the axle until near the two wheels, around which it passes on either side. Connected by means of the universal joint G and leading from said pipe are the longitudinal branch pipes G'. Secured to the outer end of pipes G' is the three-way pipe $G^3$, and secured to its upper and lower ends, respectively, are the pipes G². The lower way of said pipe projects forwardly and downwardly at an acute angle to the portion connected to pipe G'. Each of said pipes G² is provided with the movable rose H. At the upper end of said pipes G² is a fork-support, $g$, in which normally rests ball or handle $g'$, connected by a wire, $g^2$, which latter passes down through said pipe G² to the plug $g^3$. Extending diametrically across the center of said rose is partition $h'$, provided with opening $h^2$. Each of said pipes G' is provided with a valve, $g^4$, for controlling the supply of water, and pipe F is provided with valve $f$, for controlling the outflow from the reservoir.

Reservoir E is secured to the frame C by the supports $f'$. Extending horizontally through said reservoir and journaled therein in the usual manner is the shaft E', said shaft being journaled somewhat below the center of said reservoir. Secured to the shaft E' are the hubs $e$. Fastened to these hubs, respectively, are the arms $e'$. Blades E² are in turn secured to said arms, the outer ends of said blades having attached thereto on either side the blade-extensions $e^2$, between the outer ends of which are secured the brushes $e^3$. One end of the shaft E' extends exteriorly to the reservoir. Adjustably secured on this extremity is the hub J, provided with lugs $j$, similar to the lugs on the hub $a'$. By means of set-screws $j'$ the hub J may be adjusted longitudinally of shaft E'.

Secured to and rising from the frame C is the series of upright supports K, in the upper portion, $k$, of which rests the rod $k'$, extending transversely of the sprinkler. Depending from said rod are the chains $k^2$, which pass around and support branch pipes G'. By means of the hook $k^3$ the depending length of the chain may be regulated and the height of the branch pipes thereby controlled. Passing over the outer periphery, respectively, of said hubs $a'$ J is the endless chain J', which imparts the motion of the hub $a'$ to the hub J, and thence to the shaft E' and the blades E² when the sprinkler is moved.

As the shaft E' is journaled below the center of the reservoir, the rotary blades in the same in their revolution approach very near to the bottom of the reservoir, so that the brushes $e^3$ sweep and stir up the contents of the reservoir, particularly the heavy portion thereof, but in their upward revolution do not reach the upper part of the reservoir. The said brushes may be made of any suitable material—such as broom-corn, cloth, or rubber.

I preferably locate my reservoir transversely of the sprinkler, in order that the shaft E' and the two part axle-tree may lie in parallel planes, and that I may obtain direct motion from the hub of the wheel to the hub of the shaft; but the reservoir might be located in any other position without departing from the principle of the invention.

I preferably connect the branch pipes F' and G' together by means of the universal joint G; but in case it is desired to use rubber pipe $a$ simple nipple is all that will be required. The several branch pipes G² project downward and forward at an acute angle to the pipes G', the upper portion of said pipes G² serving as a lever by which the rose may be moved in order thoroughly to sprinkle the potato-vines or other objects to be sprinkled. By removing the ball $g'$ from the fork $g$ the force of the fluid will cause plug $g^3$ to descend and prevent further discharge of the fluid. I may also control the discharge of the fluid by means of the valve $g^4$. By means of the partition $h'$, placed diametrically across the center of said rose, I reduce the amount of fluid at any one time contained in said rose by about one-half, and thus lessen any discharge or waste of the fluid after the plug $g^3$ drops and stops the openings $h^2$. The several roses are of course provided with discharge-orifices $h^3$.

In my modified form of support for the distributing-pipes G', Figs. 10 and 11, M is the transverse supporting-bar on which the pipes rest. Two hangers, N, are bolted at their lower end to said bar M, and, projecting upwardly, are adjustably secured to frame C by means of the pins $m$, passing through openings $m'$. I may use this form of pipe-support in place of the chain-support shown in Fig. 2.

It frequently happens that the distance between the rows of potatoes or other product to be sprinkled varies, and by means of my two-part axle-tree I may regulate the width of the tread between the wheels to correspond with said distance as follows: I loosen the screws $b^2$ and grasp the lever D' and move it to right or left accordingly as I desire to increase or decrease the tread of the carriage. The clips $b\ b'$, after the set-screws are loosened, respectively slide along the axle-tree sections B' B. When the tread has been adjusted, the pin $d$ is inserted in one of the holes $d'$ of the lock-bar $d^2$, and the set-screws $b^2$ are then set up. It is clear that whenever the carriage is moved the rotary beaters located in the reservoir will be rotated correspondingly with the rotation of wheel E, and thus any poison introduced in the material in the reservoir will be agitated, and the heavier portions of the poison will, by means of the brushes, be lifted and kept from settling in the bottom of the reservoir.

In my first modified form (shown in Figs. 12 and 13) I support the two adjoining ends $o'$ of the two-part axle B B' in a box, O, in which they rest, and to which they are secured by means of the set-screws $o$. I use similar levers, D' $c\ c'$, pivoted in a similar manner to those shown in my first form, and the operation of regulating or adjusting the tread of the wheels is in all respects similar to said first form, the set-screws being loosened, the lever being turned, and the set-screws being set up again.

In my second modified form the two abutting ends $o\ o$ of the two-part axle B B' are joined by lap-joint and secured by bolts $p$, working in the longitudinal slot $p'$. The operation of adjusting this is similar to that of adjusting the two preceding forms, the bolts being loosened, the tread widened or contracted as desired, and the bolts again tightened.

In my third modified form (shown in Figs. 16 and 17,) two lever-bars, Q Q, respectively pivoted by pivots $q$ $q$ to the front portion of the frame C, extend rearwardly to the back of the carriage. They are held in place by pins $d$, passing through holes $d'$ of the lock-bar $d^2$. Pivoted to said lever-bars are the clips $q'$ $q^2$, respectively secured to the two parts B B' of the axle. When it is desired to adjust the tread, the pins $d$ are withdrawn from the holes, the lever-bars moved the required distance, and the pins returned to place.

In my fourth modified form I use a right and left hand screw, R, threaded into the two portions B B' of the axle, said screw being provided with hand wheel $r$, the abutting ends of said axle-tree being strengthened by clips $r^2$, bolted on the same. In this form it is necessary merely to turn the handle one way or the other to adjust the tread of the machine, the weight of the reservoir on the carriage being sufficient to lock said screw against any movement which might be caused by the movement of the carriage.

I claim—

1. In an apparatus for sprinkling, the combination of horizontal cylindrical reservoir E, rotary shaft E', horizontally journaled therein below the diametric center of the reservoir and having one extremity extending beyond the end of said reservoir, said shaft provided with a series of radial arms, hub J, secured to said shaft interior to the reservoir and provided with lugs $j$, a carriage supporting said reservoir and provided with wheels A A', two-part axle-tree B B', the two portions of which have direct bearing against each other, lever D', and connecting-levers $c$ $c'$, lever $c$ having its extremities respectively pivoted to portion B and lever D', lever $c'$ having its extremities respectively pivoted to lever D' and portion B', said wheel A provided with hub $a'$, the latter provided on its outer periphery with lugs $a^2$, and endless chain J, engaging with the lugs $a^2$ $j$, substantially as set forth.

2. In an apparatus for sprinkling, a horizontal cylindrical reservoir provided with a rotary shaft, hub J, adjustably keyed on said shaft exterior to the reservoir, a carriage supporting said reservoir, said carriage provided with wheels A A', the former provided with an enlarged hub, $a'$, endless chain J', directly engaging with hubs J $a'$, bipartite axle B B', on which said wheels are journaled, the two portions of said axle having direct bearing against each other, distributing-pipes F F' G', leading from said reservoir, universal joint G, connecting said latter two pipes, rose H and three-way pipe $G^3$, connected at two of its ends, respectively, to pipe G' and rose H, the latter projecting forward at an acute angle relative to pipe G', and pipe $G^2$, connected to the third and upwardly-projecting portion of said pipe $G^3$ and adapted to be used as a lever-handle to turn said rose in desired direction, fork-support $g$, secured to the upper end of pipe $G^2$, plug $g^3$, controlling the opening in said rose H, ball $g'$, adapted to rest in said fork, and wire $g^2$, connecting said plug and ball, substantially as set forth.

In testimony that I claim the foregoing to be my invention I have hereunto set my hand this 8th day of September, A. D. 1887.

GEORGE A. FARRAND.

Witnesses:
J. B. FAY,
C. B. NASH.